United States Patent
Hida et al.

Patent Number: 5,883,232
Date of Patent: Mar. 16, 1999

[54] HYDROPHOBIC CATIONIC DYES AND THERMAL TRANSFER INK RIBBONS USING THE SAME

[75] Inventors: Masanobu Hida; Kengo Ito, both of Miyagi; Yoshio Fujiwara, Tochigi; Nobuo Suzuki, Tokyo; Hiroyoshi Yamaga, Tokyo; Junichi Hagiwara, Tokyo, all of Japan

[73] Assignees: Sony Corporation, Tokyo; Hodog aya Chemical Co., Ltd., Kanajawa, both of Japan

[21] Appl. No.: 114,980

[22] Filed: Jul. 14, 1998

Related U.S. Application Data

[62] Division of Ser. No. 674,607, Jun. 28, 1996, Pat. No. 5,834,600.

[30] Foreign Application Priority Data

Jun. 30, 1995 [JP] Japan ..... 7-188540

[51] Int. Cl.⁶ ............... C04B 9/02; B41M 3/12; G03C 1/73; G03C 1/735
[52] U.S. Cl. ............ 534/607; 106/14.5; 106/31.5; 427/144; 427/148; 427/151; 430/338; 430/340; 430/343; 430/519
[58] Field of Search ............ 534/607; 106/14.5, 106/31.5; 430/338; 427/144

[56] References Cited

U.S. PATENT DOCUMENTS

| | | | |
|---|---|---|---|
| 3,679,656 | 7/1972 | Iizuka et al. | 534/607 |
| 4,039,537 | 8/1977 | Kuhlthau | 534/607 |

FOREIGN PATENT DOCUMENTS

| | | | |
|---|---|---|---|
| 2816350 | 10/1978 | Germany | 534/607 |
| 0208475 | 5/1984 | Germany | 534/607 |
| 3602587 | 7/1987 | Germany | 534/607 |
| 51-23516 | 2/1976 | Japan | 534/607 |
| 6-40172 | 6/1994 | Japan | |

*Primary Examiner*—Floyd D. Higel
*Attorney, Agent, or Firm*—Hill & Simpson

[57] ABSTRACT

Disclosed are diazahemicyanine hydrophobic cationic dyes represented by the formula (1):

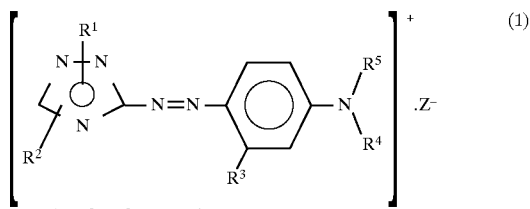

wherein $R^1$, $R^2$, $R^3$ and $R^4$ are lower alkyl groups having not more than 5 carbon atoms, $R^5$ is a lower alkyl group having not more than 5 carbon atoms or a lower alkoxy lower alkyl group having not more than 6 carbon atoms, and $Z^-$ is a counter ion having a hydrophobic organic group, and a thermal transfer ink ribbon having a substrate and and ink layer laminated thereon containing said cationic dye.

4 Claims, 1 Drawing Sheet

HYDROPHOBIC CATIONIC DYES AND THERMAL TRANSFER INK RIBBONS USING THE SAME

This application is a divisional of application Ser. No. 08/674,607, now U.S. Pat. No. 5,834,600.

BACKGROUND OF THE INVENTION

1. Field of the Invention

The present invention relates to a hydrophobic cationic dye suitable for image formation by sublimation thermal transfer recording and a thermal transfer ink ribbon using the same.

2. Description of the Prior Art

Hitherto, sublimation thermal transfer recording has been carried out to obtain high gradation full color hard copies from image information such as video or computer graphics. In the sublimation thermal transfer recording, the image recording has been performed by using a thermal transfer ink ribbon in which an ink layer having a sublimation dye or thermal diffusion dye dispersed in a hydrophobic polymer binder is formed on a polyester substrate, and a photographic paper in which a dye receiving layer comprising a hydrophobic polymer is formed on a synthetic paper substrate. More specifically, the ink layer of the ink ribbon is superimposed on the dye receiving layer of the photographic paper, and heat is applied on the polyester substrate of the ink ribbon by a thermal head or the like in accordance with an image signal, whereby migrating the dye in the ink layer to the dye receiving layer of the photographic paper to form an image.

As the dye used in thermal transfer ink ribbons for such sublimation thermal transfer recording, disperse dyes have generally been used taking the dispersibility in the hydrophobic polymer binder in the ink layer; however, it has recently been proposed to employ hydrophobic cationic dyes having more excellent sensitivity in the transfer, hue of images and light resistance than the disperse dyes (Japanese Patent Application Laying-open No. 6-40172). In the patent application, it has been proposed to use diazacarbocyanine hydrophobic cationic dyes for yellow color, oxazine hydrophobic cationic dyes for cyan color, and hemicyanine hydrophobic cationic dyes for magenta color (Japanese Patent Application Laying-open No. 6-40172).

However, the hemicyanine hydrophobic cationic dyes for magenta color have a problem of insufficient light resistance and transfer concentration. An attempt has been done to use a laurylsulfate salt of C.I. Basic Red 22 represented by the formula (2):
which is one of diazahemicyanine hydrophobic cationic dyes having more excellent properties such as light resistance and transfer concentration than hemicyanine hydrophobic cationic dyes, as a dye for magenta color.

OBJECT AND SUMMARY OF THE INVENTION

However, when full color sublimation thermal transfer recording is effected with a thermal transfer ink ribbon using the laurylsulfate salt of C.I. Basic Red 22 represented by the formula (2) as a dye for magenta color, there is a problem of color reproducibility. Thus, the resulting image has a different color tone from the intended full color image since the dye of formula (2) has a yellowish red hue, that is, maximum absorption wave length ($\lambda$max) being 520 nm.

The present invention will solve such problems of prior art and has an object of providing a novel diazahemicyanine hydrophobic cationic dye having a good light resistance and a good reddish purple (magenta) hue with a low proportion of other colors mixed.

The present inventor has found that a diazahemicyanine hydrophobic cationic dye having a specific combination of substituents exhibits a better reddish purple (magenta) color hue and more excellent light resistance as compared with the laurylsulfate salt of C.I. Basic Red 22 and completed the present invention.

Thus, the present invention provides a diazahemicyanine hydrophobic cationic dye represented by the formula (1): wherein $R^1$, $R^2$, $R^3$ and $R^4$ are lower alkyl groups, such as those having not more than 5 carbon atoms, $R^5$ is a lower alkyl group, such as one having not more than 5 carbon atoms, or a lower alkoxy lower alkyl group, such as one having not more than 6 carbon atoms, and $Z^-$ is a counter ion having a hydrophobic organic group.

The present invention also provides a thermal transfer ink ribbon having a substrate and an ink layer laminated thereon wherein said ink layer contains the diazahemicyanine hydrophobic cationic dye represented by the formula (1).

The diazahemicyanine hydrophobic cationic dyes of the present invention will be hereinafter described in detail.

The diazahemicyanine hydrophobic cationic dyes of the present invention have a maximum absorption wave length near 540 nm and a purer reddish purple (magenta) color hue than the yellowish red hue of the laurylsulfate salt of C.I. Basic Red 22. Accordingly, the use of these hydrophobic cationic dyes in sublimation thermal transfer recording enables the formation of full color images with good color reproducibility. Further, the hydrophobic cationic dyes have a lower alkyl group linked to the phenylene group and, therefore, have an improved light resistance.

In the formula (1), a preferred combination of $R^1$, $R^2$, $R^3$, $R^4$ and $R^5$ may be such that $R^1$, $R^2$ and $R^3$ are methyl groups, $R^4$ is an ethyl or butyl group, and $R^5$ is an ethyl, ethoxyethyl or butoxyethyl group.

The hydrophobic organic groups of the counter ions having a hydrophobic organic group, $Z^-$ in the formula (1), may include higher alkyl groups, such as lauryl group, and aralkyl or alkylaryl groups such as dodecylphenyl group. The ion sites of the counter ions may include sulfate, sulphonate and succinate anions.

Preferred examples of the counter ions having a hydrophobic organic group, $Z^-$, include lauryl sulfate, dodecylbenzene sulphonate, diethylhexyl sulphosuccinate and dodecylsulphonate anions.

In the formula (1), $R^1$ and $R^2$ are linked to the triazole ring at 1- and 4-positions, 2- and 4-positions, or 1- and 4-positions, preferably at 2- and 4-positions since light absorption of the dye can be shifted to longer wave lengths.

Methods for the preparation of the diazahemicyanine hydrophobic cationic dyes of the present invention will be described with reference to the reaction scheme as shown below wherein $R^1$, $R^2$, $R^3$, $R^4$, $R^5$ and $Z^-$ are defined above for the formula (1).

3-Aminotriazole of the formula (a) is diazotized to prepare the diazonium salt of the formula (b). The diazotization may be carried out in a conventional manner. For example, sodium nitrite may be reacted with the 3-aminotriazole of the formula (2) under ice cooling in an aqueous sulfuric acid solution.

The diazonium salt of the formula (b) is then coupled with an aniline derivative of the formula (c) under ice cooling. After the reaction, the reaction mixture is poured into water and the pH of the aqueous phase is neutralized, yielding an azo dye of the formula (d).

The azo dye of the formula (d) is fractionated and dried, and then alkylated with a lower alkyl sulfate (($R^1$)$_2$SO$^4$ and ($R^2$)$_2$SO$_4$) in a non-aqueous solvent to yield a diazahemicyanine hydrophilic cationic dye of the formula (e). $R^1$ and $R^2$ herein may be same or different.

Finally, the diazahemicyanine hydrophilic cationic dye of the formula (e) is reacted with a salt $Z^-M^+$ wherein M is preferably an alkali metal such as sodium to replace the counter ion with the hydrophobic $Z^-$. Thus, there is obtained a diazahemicyanine hydrophobic cationic dye of the formula (1).

The thermal transfer ink ribbon using the diazahemicyanine hydrophilic cationic dye according to the present invention will be described.

The thermal transfer ink ribbon of the present invention is composed of a substrate 1 and an ink layer 2 laminated thereon as shown in FIG. 1. A heat resistant lubricating layer 3 may be provided on the back side of the substrate 1 (FIG. 2). The ink layer 2 contains a diazahemicyanine hydrophobic cationic dye of the formula (1) having good light resistance and hue. Therefore, the resulting image using the ink ribbon has an improved light resistance. Further, color reproducibility will be good.

In the thermal transfer ink ribbon of the present invention, the substrate 1 may be any one for conventional thermal transfer ink sheets and may include, for example, resin sheets such as polyester films (e.g., PET etc.), polyimide films and polyamide films (e.g., nylons etc.); and papers such as condenser and glassine papers. Usually, the thickness of the substrate may preferably be 3 to 20 $\mu$m.

The ink layer comprises the diazahemicyanine hydrophobic cationic dye of the formula (1) dispersed in a binder resin. Too low contents thereof in the ink layer 2 can not result in sufficient image concentrations while too much reduces the film forming property of the ink layer 2. Usually, the content is preferably 1 to 70% by weight of the ink layer 2.

The binder in the ink layer 2 may be any of binders conventionally used in ink layers of sublimation thermal transfer ink ribbons and may include, for example, butyral resins, polyvinyl alkyl acetal resins, cellulose ester resins, cellulose ether resins, urethane resins, polyester resins and polyvinyl acetate resins.

Usually, the thickness of the ink layer 2 is preferably 0.5 to 5.0 $\mu$m.

Further, the ink layer 2 may optionally contain, for example, a plasticizer, solvent, caking agent.

The heat resistant lubricating layer 3 may be the same as one used in conventional sublimation thermal transfer ink ribbons.

The thermal transfer ink ribbon of the present invention may be prepared in any conventional manner. For example, the ink ribbon of FIG. 2 may be prepared by coating a heat resistant lubricating layer-forming coating material on the back side of the substrate to form a heat resistant lubricating layer, coating an ink layer-forming coating material containing the diazahemicyanine hydrophobic cationic dye on the opposite side of the substrate, and drying to form an ink layer.

The thus obtained thermal transfer ink ribbon can be well applied to the conventional sublimation thermal transfer recording devices.

The diazahemicyanine hydrophobic cationic dyes of the present invention exhibit a good light resistance and color hue. Accordingly, a thermal transfer ink ribbon using the dye as a magenta dye can form an image having a good light resistance and color reproducibility.

DETAILED DESCRIPTION OF THE PREFERRED EMBODIMENTS

Figure 1:
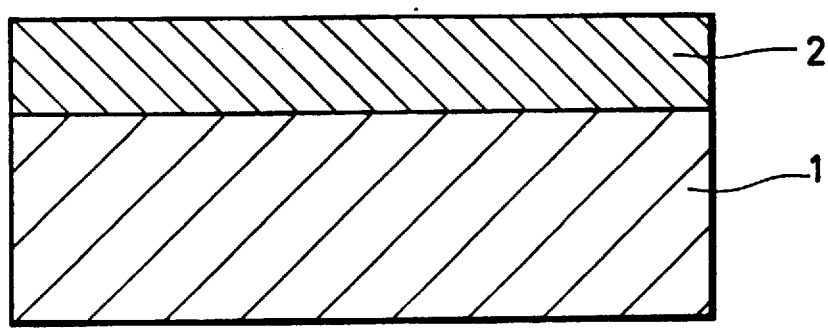
FIG. 1 is a cross sectional view of the thermal transfer ink ribbon of the present invention.
Figure 2:
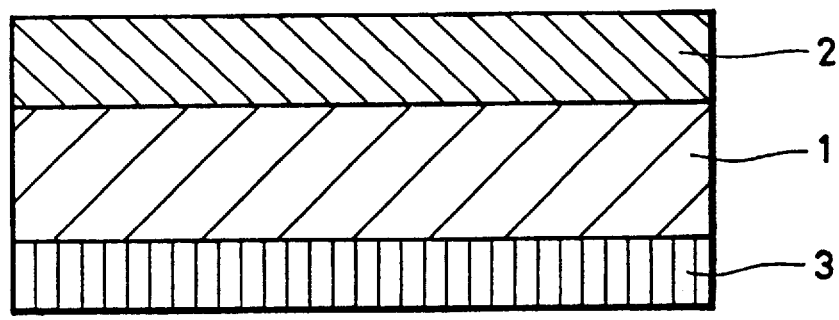
FIG. 2 is a cross sectional view of the thermal transfer ink ribbon of the present invention.

The present invention will be illustrated by way of examples.

Inventive Example 1

In a solution of 20 g of sulfuric acid in 50 ml of water, 8.4 g of 3-amino-1,2,4-triazole was dissolved. While the solution was maintained at −2° to 0° C., 8.5 g of sodium nitrite was added thereinto. Diazotization reaction was effected for 3 hours.

After the diazotization reaction was completed, 16 g of N,N-diethyl-m-toluidine was added to the reaction mixture at the same temperature and coupling reaction was effected for 6 hours. After the reaction was completed, the reaction mixture was poured into 500 g of ice and the pH of the aqueous phase was adjusted with an aqueous sodium hydroxide solution to 6 to 7 to precipitate an azo dye.

The precipitated azo dye was filtered out and dried. The dye was dissolved in 300 ml of monochlorobenzene. To this solution 40 g of dimethyl sulfuric acid was dropwise added at a reaction temperature of 90° to 95° C. to dimethylate and cationize the azo dye. The released resulting cationic dye was fractionated by decantation and washed with a small amount of toluene to yield 36 g of a diazahemicyanine hydrophilic cationic dye.

The resultant cationic dye was dissolved in 700 ml of water and an aqueous solution of 36 g of sodium lauryl sulfate in 300 ml of water was added. Thus, the cationic dye was hydrophobitized to precipitate and the resulting dye was fractionated and dried to yield 48 g of a diazahemicyanine hydrophobic cationic dye represented by the formula (3):

The hydrophobic cationic dye had a maximum absorption wave length ($\lambda$max) of 538.6 nm (methanol) and exhibited a good reddish purple (magenta) hue. Inventive Example 2

The procedures of Inventive Example 1 were repeated except that N,N-diethyl-m-toluidine was replaced with 20.7 g of N-ethoxyethyl-N-ethyl-m-toluidine to yield 53 g of a diazahemicyanine hydrophobic cationic dye represented by the formula (4):

The hydrophobic cationic dye had a maximum absorption wave length ($\lambda$max) of 540 nm (methanol) and exhibited a good reddish purple (magenta) hue.

Inventive Example 3

The procedures of Inventive Example 1 were repeated except that N,N-diethyl-m-toluidine was replaced with 23.5 g of N-ethoxyethyl-N-butyl-m-toluidine and 36 g of sodium lauryl sulfate was replaced with 35 g of sodium dodecyl benzene sulphonate to yield 61 g of a diazahemicyanine hydrophobic cationic dye represented by the formula (5):

The hydrophobic cationic dye had a maximum absorption wave length ($\lambda$max) of 539.4 nm (methanol) and exhibited a good reddish purple (magenta) hue.

Inventive Example 4

The procedures of Inventive Example 1 were repeated except that N,N-diethyl-m-toluidine was replaced with 23.5 g of N-butoxyethyl-N-ethyl-m-toluidine to yield 56 g of a diazahemicyanine hydrophobic cationic dye represented by the formula (6):

The hydrophobic cationic dye had a maximum absorption wave length ($\lambda$max) of 540.3 nm (methanol) and exhibited a good reddish purple (magenta) hue.

Inventive Examples 5 to 8 and Comparative Example 1

The hydrophobic cationic dyes of the formulas (3) to (6) obtained in Inventive Examples 1 to 4 were used to prepare thermal transfer ink ribbons in the following manner. In Comparative Example 1, the hydrophobic cationic dye used was the lauryl sulfate salt of C.I. Basic Red 22 of the formula (2).

(Preparation of thermal transfer ink ribbons)

Thermal transfer ink ribbons were prepared by coating a composition for forming an ink layer as shown in Table 1 with a wire bar coater on one side of a polyethylene terephthalate (PET) film substrate of 6 $\mu$m in thickness having a heat resistant lubricating layer provided on the opposite side so that the dry thickness of the ink layer was 1 $\mu$m.

TABLE 1

Composition for forming ink layer

| Component | Amount formulated (part by weight) |
|---|---|
| Hydrophobic cationic dye | 2 |
| Inventive Example 5 Dye of formula (3) | |
| Inventive Example 6 Dye of formula (4) | |
| Inventive Example 7 Dye of formula (5) | |
| Inventive Example 8 Dye of formula (6) | |
| Comparative Example 1 Dye of formula (2) | |
| Polyvinyl butyral | 2 |
| (6000-CS, DENKI KAGAKU KOGYO K.K.) | |
| Toluene | 25 |
| Methyl ethyl ketone | 25 |

(Preparation of photographic paper)

In order to test and evaluate the light resistance of images obtained by using the thermal transfer ink ribbons, photographic papers were prepared in the following manner.

Photographic papers were prepared by coating a composition for forming a dye receiving layer as shown in Table 2 with a wire bar coater on the surface of a synthetic paper of 150 $\mu$m in thickness (FPG-150, Oji Yuka Gosei-shi) so that the dry thickness of the layer was 8 $\mu$m and drying at 100° C. for 60 minutes.

TABLE 2

Composition for forming dye receiving layer

| Component | Amount formulated (part by weight) |
|---|---|
| Vinyl chloride/vinyl acetate copolymer (Denka Vinyl #1000GK, DENKI KAGAKU KOGYO K.K.) | 100 |
| Mold releasing agent (SF8427, TORAY DOW-CORNING CO., LTD.) | 4 |
| Cross linking agent (Takenate D-110N, TAKEDA CHEMICAL INDUSTRIES LTD.) | 5 |
| Toluene | 200 |
| Methyl ethyl ketone | 200 |

(Evaluation)

The thus obtained ink ribbon and photographic paper were applied to a color video printer (Tradename: UP-3000, Sony Corporation) and four kinds of rush printing were carried out so that an initial image density (Do) was 0.5, 1.0, 1.5 or 2.0, respectively. The ink ribbons of Inventive Examples 5 to 8 gave rush prints with a good magenta hue while an image with a yellowish red hue was obtained in Comparative Example 1.

The obtained images were irradiated with a xenon arc lamp at 90,000 kJ/m$^2$ and the light resistance was evaluated by calculating a percent of image remaining after irradiation. The results are shown in Table 3.

The percent of remaining image was defined as a ratio of an image density (Dt) measured after the irradiation to the initial image density (Do); i.e., percent of remaining image (%)=100 Dt/Do. The higher the percent of remaining image, the better the light resistance.

TABLE 3

| Initial image density | Remaining image (%) | | | | Comparative Example 1 |
|---|---|---|---|---|---|
| | Inventive Example | | | | |
| (Do) | 5 | 6 | 7 | 8 | 1 |
| 2.0 | 85 | 85 | 88 | 85 | 61 |
| 1.5 | 79 | 83 | 83 | 83 | 57 |
| 1.0 | 65 | 82 | 83 | 74 | 54 |
| 0.5 | 60 | 70 | 77 | 77 | 45 |

As seen from Table 3, the thermal transfer ink ribbons using the diazahemicyanine hydrophobic cationic dyes according to the present invention gave images with a better light resistance than the ink ribbon of Comparative Example 1.

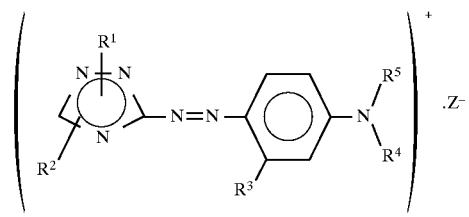

Formula 1, 3,

-continued
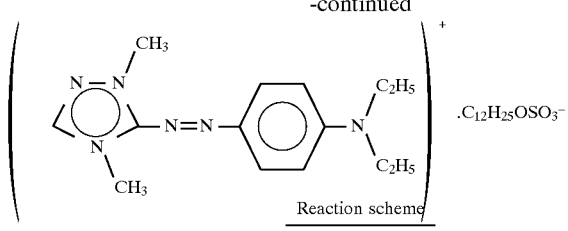
Formula 2
Reaction scheme
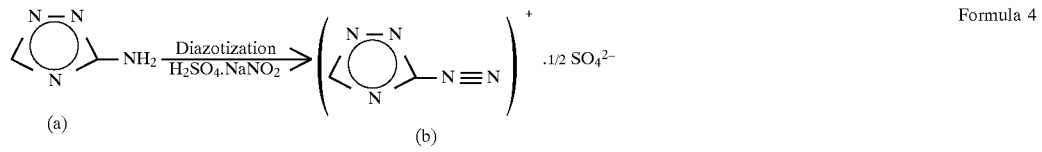
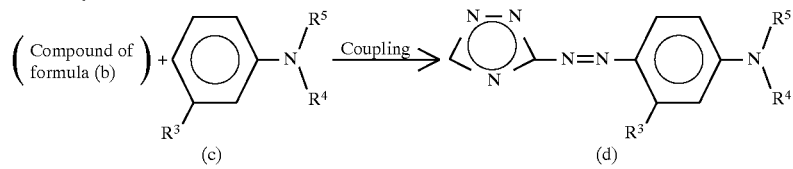
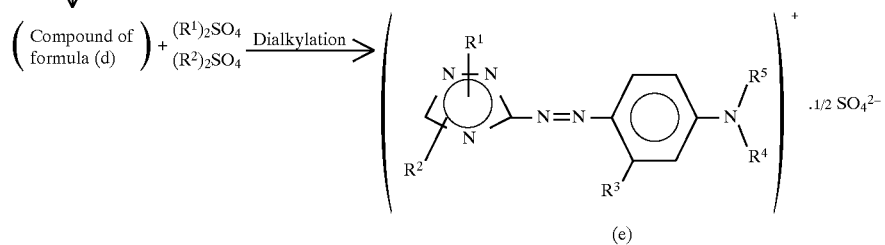
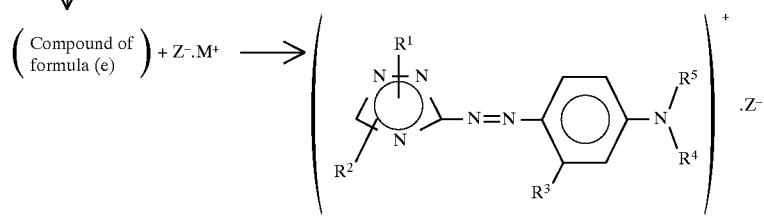
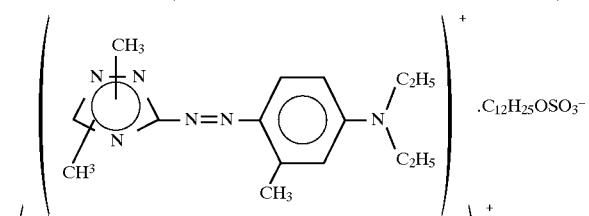
Formula 5
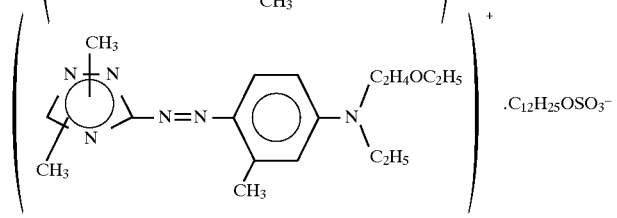
Formula 6

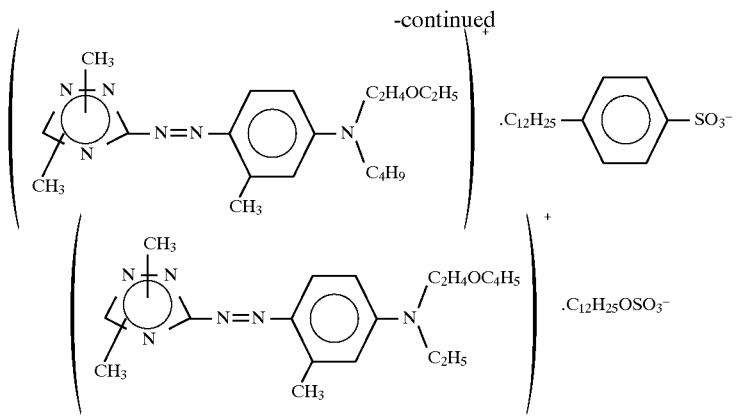

Formula 7

Formula 8

We claim:

1. A thermal transfer ink ribbon having a substrate and an ink layer laminated thereon and containing a diazahemicyanine hydrophobic cationic dye represented by the formula (1):

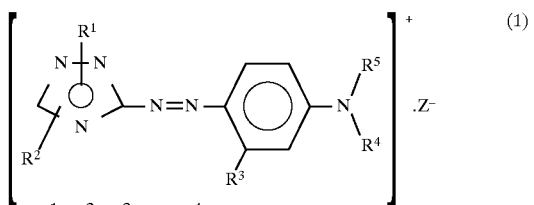

wherein $R^1$, $R^2$, $R^3$ and $R^4$ are lower alkyl groups having not more than 5 carbon atoms, $R^5$ is a lower alkyl group having not more than 5 carbon atoms or a lower alkoxy lower alkyl group having not more than 6 carbon atoms, and $Z^-$ is a counter ion having a hydrophobic organic group.

2. The thermal transfer ink ribbon of claim 1, wherein $R^1$, $R^2$ and $R^3$ are methyl groups, $R^4$ is an ethyl or butyl group, and $R^5$ is an ethyl, ethoxyethyl or butoxyethyl group.

3. The thermal transfer ink ribbon of claim 2, wherein $Z^-$ is an anion selected from the group consisting of higher alkyl sulfate, higher alkyl sulphonate, aralkyl sulfate, aralkyl sulphonate, alkyl aryl sulfate and alkyl aryl sulphonate anions.

4. The thermal transfer ink ribbon of claim 2, wherein $R^1$ and $R^2$ are linked to the triazole ring of the formula (1) at 2- and 4-positions.

* * * * *